United States Patent
Be et al.

(10) Patent No.: US 9,776,563 B1
(45) Date of Patent: Oct. 3, 2017

(54) GEOFENCING APPLICATION FOR DRIVER CONVENIENCE

(71) Applicant: Ford Global Technologies, LLC, Dearborn, MI (US)

(72) Inventors: Tuan Anh Be, Livonia, MI (US); Nicholas Colella, Grosse Ile, MI (US); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/075,925

(22) Filed: Mar. 21, 2016

(51) Int. Cl.
| | | |
|---|---|---|
| G08G 1/123 | (2006.01) | |
| B60Q 9/00 | (2006.01) | |
| G08G 1/133 | (2006.01) | |
| H04W 4/02 | (2009.01) | |
| H04W 4/04 | (2009.01) | |

(52) U.S. Cl.
CPC .............. *B60Q 9/00* (2013.01); *G08G 1/133* (2013.01); *H04W 4/021* (2013.01); *H04W 4/046* (2013.01)

(58) Field of Classification Search
CPC ...................................................... G08G 1/207
USPC ..................................... 340/988, 995, 24, 27
See application file for complete search history.

(56) References Cited

U.S. PATENT DOCUMENTS

| | | | | |
|---|---|---|---|---|
| 8,140,358 B1* | 3/2012 | Ling | ...................... | G06Q 40/08 340/439 |
| 2004/0257208 A1* | 12/2004 | Huang | .................. | B60R 25/102 340/426.1 |
| 2006/0181411 A1* | 8/2006 | Fast | ...................... | G01S 5/0018 340/539.13 |
| 2011/0148626 A1* | 6/2011 | Acevedo | ............... | G01S 5/0027 340/539.13 |
| 2012/0242469 A1* | 9/2012 | Morgan | .................. | B60K 28/06 340/426.11 |
| 2013/0204517 A1 | 8/2013 | Raju et al. | | |
| 2013/0226449 A1* | 8/2013 | Rovik | .................. | G01C 21/362 701/424 |
| 2014/0236462 A1* | 8/2014 | Healey | .................. | G08G 1/0962 701/117 |
| 2014/0354451 A1 | 12/2014 | Tonguz et al. | | |
| 2015/0095156 A1 | 4/2015 | Sauerbrey et al. | | |
| 2015/0181382 A1* | 6/2015 | McDonald | .............. | H04L 67/18 455/456.3 |
| 2015/0266382 A1* | 9/2015 | Penmetsa | ................ | B60L 1/003 307/10.1 |
| 2015/0274156 A1* | 10/2015 | Phillips | .................. | B60W 10/06 701/22 |
| 2015/0292894 A1* | 10/2015 | Goddard | ............ | G01C 21/3492 701/400 |
| 2015/0339928 A1 | 11/2015 | Ramanujam | | |
| 2016/0049026 A1* | 2/2016 | Johnson | ............. | G07C 9/00007 340/5.61 |

(Continued)

*Primary Examiner* — Kevin Kim
(74) *Attorney, Agent, or Firm* — Jennifer M. Stec; Brooks Kushman P.C.

(57) ABSTRACT

A vehicle computer system, comprising a wireless transceiver configured to communicate with a mobile device. The vehicle computer system further comprises a processor configured to output an alert to a driver of a vehicle indicating a location of a hazardous area when the vehicle is in a pre-defined distance from a boundary of a geo-fence of the driver defining the hazardous area, and activate a vehicle function addressing the hazardous area based upon the vehicle entering a boundary of the geo-fence.

19 Claims, 5 Drawing Sheets

(56) References Cited

U.S. PATENT DOCUMENTS

| | | | |
|---|---|---|---|
| 2016/0093210 A1* | 3/2016 | Bonhomme | G08G 1/0967 340/905 |
| 2016/0180721 A1* | 6/2016 | Otulic | G08G 9/02 701/2 |
| 2017/0045367 A1* | 2/2017 | Park | G01C 21/3697 |
| 2017/0057322 A1* | 3/2017 | Kava | B60H 1/00778 |

* cited by examiner

GEOFENCING APPLICATION FOR DRIVER CONVENIENCE

TECHNICAL FIELD

The illustrative embodiments generally relate to utilizing features of a vehicle computer system for geofencing.

BACKGROUND

The addition of vehicle information and infotainment systems to vehicles provides a wealth of entertainment and information delivery options for vehicle occupants. Through on-board resources and remote connections, occupants can stream music and movies, receive news updates, access remote databases, obtain navigation information and perform numerous other tasks that used to require a secondary computing system, such as a smart phone or PC with a wireless network card.

Using the onboard system, drivers can communicate with off board, cloud-based resources and access any information useful for driving or travel. Certain software add-ons allow users to be smart-routed to recommended stopping points, obtain coupons or deals tailored to users, and even alert emergency providers and/or user doctor's in the event of a medical emergency. Geofencing may also be utilized for vehicles to define a virtual boundary of a vehicle. Geofencing may be accomplished by utilizing GPS coordinates of a navigation system in a vehicle.

SUMMARY

A first illustrative embodiment discloses a vehicle computer system comprising a wireless transceiver configured to communicate with a mobile device. The vehicle computer system further comprises a processor configured to output an alert to a driver of a vehicle indicating a location of a hazardous area when the vehicle is in a pre-defined distance from a boundary of a geo-fence of the driver defining the hazardous area, and activate a vehicle function addressing the hazardous area based upon the vehicle entering a boundary of the geo-fence.

A second illustrative embodiment discloses a method comprising determining a driver of the vehicle utilizing one or more vehicle controllers and responsively receiving one or more geo-fences associated with the driver and a high-crime area along a route defined by route data. The method further comprises outputting an alert to the driver indicating a location of the high-crime area when the vehicle is within a pre-defined distance of the geo-fence, and activating a vehicle function addressing the high-crime area and in response to a request from a remote server based upon the vehicle entering a boundary of the geo-fence.

A third illustrative embodiment discloses a vehicle computer system comprising a processor configured to, in response to identifying a driver of the vehicle and a vehicle route, establish a geo-fence corresponding to the driver and a high-crime rate area along the route, and executing commands to request a vehicle controller to activate a mechanical vehicle function addressing the area based upon entering a boundary of the geo-fence, and output an alert to the driver indicating activation of the function.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

A geo-fence refers to a radius or other virtual perimeter defined over a geographic area. Geo-fences may be defined to indicate areas in which specific types of attributes affecting drivers have been reported. For instance, geo-fences may indicate areas of elevated crime, severe weather, proximity to a destination, or other aspects relevant to the driver.

Geo-fences may be defined based on data received from various data sources. In an example, geo-fences indicating elevated crime areas may be identified based on data received from government crime statistics servers. In another, example, geo-fences indicating weather conditions areas may be identified based on data received from weather services. In yet a further example, driver-specific geo-fences may be defined by the driver.

The types of geo-fence may be further associated with one or more predefined actions. These actions may include actions to be automatically performed by the vehicle when the vehicle crosses the geo-fence, or actions to be performed when the vehicle reaches a predefined distance of the geo-fence. The actions may include for example, providing an alert, rolling up vehicle windows, activating one or more vehicle safety features, turning on headlights, or recommending an alternate vehicle route.

As the geo-fences may be dynamically updated from the data sources, the predefined actions may be automatically performed for new and updated geo-fences, without requiring the driver to have prior knowledge of the types or boundaries of the geo-fenced areas.

Figure 1:
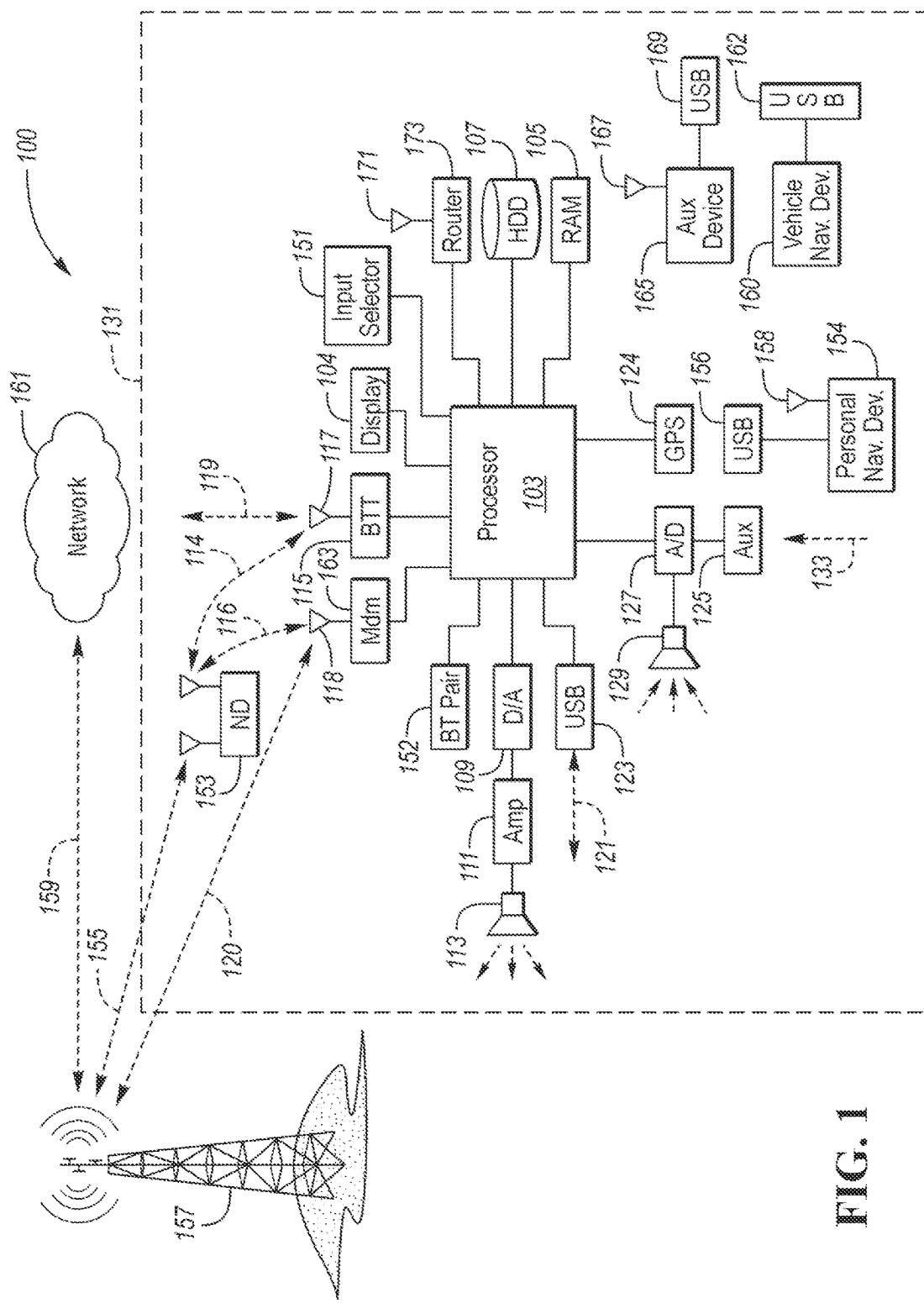
FIG. 1 illustrates an example block topology for a vehicle-based computing system for a vehicle.

FIG. 1 illustrates an example block topology for a vehicle-based computing system 100 (VCS) for a vehicle 131. An example of such a VCS 100 is the FORD SYNC system manufactured by FORD MOTOR COMPANY. A vehicle 131 enabled with the VCS 100 may contain a visual front-end interface 104 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment shown in FIG. 1, a processor 103 controls at least some portion of the operation of the VCS 100. Provided within the vehicle, the processor allows onboard processing of commands and routines. Further, the processor is connected to both non-persistent 105 and persistent storage 107. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 129, an auxiliary input 125 (for input 133), a USB input 123, a GPS input 124 and a BLUETOOTH input 115 are all provided. An input selector 151 is also provided, to allow a user to select between various inputs. Input to both the microphone and the auxiliary connector is converted from analog to digital by a converter 127 before being passed to the processor. Although not shown, these and other components may be in communication with the VCS 100 over a vehicle multiplex network (such as, but not limited to, a CAN bus) to pass data to and from the VCS 100 (or components thereof).

Outputs to the system can include, but are not limited to, a visual display 104 and a speaker 113 or stereo system output. The speaker is connected to an amplifier 111 and receives its signal from the processor 103 through a digital-to-analog converter 109. Output can also be made to a remote BLUETOOTH device such as PND 154 or a USB device such as vehicle navigation device 160 along the bi-directional data streams shown at 119 and 121 respectively.

In one illustrative embodiment, the VCS 100 uses the BLUETOOTH transceiver 115 to communicate 117 with a user's nomadic device 153 (e.g., wearable device, cell phone, smart phone, PDA, tablet, a device having wireless remote network connectivity, etc.). The nomadic device (ND) can then be used to communicate 159 with a network 161 outside the vehicle 131 through, for example, communication 155 with a cellular tower 157. In some embodiments, tower 157 may be a WiFi access point.

Exemplary communication between the nomadic device and the BLUETOOTH transceiver is represented by signal 114.

Pairing a nomadic device 153 and the BLUETOOTH transceiver 115 can be instructed through a button 152 or similar input. Accordingly, the CPU is instructed that the onboard BLUETOOTH transceiver will be paired with a BLUETOOTH transceiver in a nomadic device. Additionally, the vehicle can pair or connect to a Wi-Fi access point utilizing similar input.

Data may be communicated between processor 103 and network 161 utilizing, for example, a data-plan, data over voice, or DTMF tones associated with nomadic device 153. Alternatively, it may be desirable to include an onboard modem 163 having antenna 118 in order to communicate 16 data between CPU 103 and network 161 over the voice band. The nomadic device 153 can then be used to communicate with a network 161 outside the vehicle 131 through, for example, communication 155 with a cellular tower 157. In some embodiments, the modem 163 may establish communication 120 with the tower 157 for communicating with network 161. As a non-limiting example, modem 163 may be a USB cellular modem and communication 120 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 153 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 103.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 megabytes for stationary or walking users and 385 kbs for users in a moving vehicle. 3G standards are now being replaced by IMT-Advanced (4G) which offers 100 mbs for users in a vehicle and 100 gbs for stationary users. If the user has a data-plan associated with the nomadic device, it is possible that the data-plan allows for broad-band transmission and the system could use a much wider bandwidth (speeding up data transfer). In still another embodiment, nomadic device 153 is replaced with a cellular communication device (not shown) that is installed to vehicle 131. In yet another embodiment, the nomadic device (ND) 153 may be a wireless local area network (LAN) device capable of communication over, for example (and without limitation), an 802.11g network (i.e., WiFi, or other standards such as 802.11a, b, n, ac, p or other future standards) or a WiMax network. The vehicle may also include its own WiFi router to connect to a wireless access point.

In one embodiment, incoming data can be passed through the nomadic device via a data-over-voice or data-plan, through the onboard BLUETOOTH transceiver and into the vehicle's internal processor 103. In the case of certain temporary data, for example, the data can be stored on the HDD or other storage media 107 until such time as the data is no longer needed.

Additional sources that may interface with the vehicle include a personal navigation device 154, having, for example, a USB connection 156 and/or an antenna 158, a vehicle navigation device 160 having a USB 62 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the processor 103 could be in communication with a variety of other auxiliary devices 165. These devices can be connected through a wireless 167 or wired 169 connection. Auxiliary device 165 may include, but are not limited to, personal media players, wireless health devices, portable computers, nomadic devices, key fobs and the like.

Also, or alternatively, the CPU could be connected to a vehicle-based wireless router 173, using for example a WiFi (IEEE 803.111) 171 transceiver. This could allow the CPU to connect to remote networks in range of the local router 173.

In addition to having exemplary processes executed by a VCS 100 located in a vehicle 131, in certain embodiments, the exemplary processes may be executed by a computing system in communication with the VCS 100. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply particular VACS to a given solution. In all solutions, it is contemplated that at least the VCS 100 located within the vehicle 131 itself is capable of performing the exemplary processes.

Figure 2:
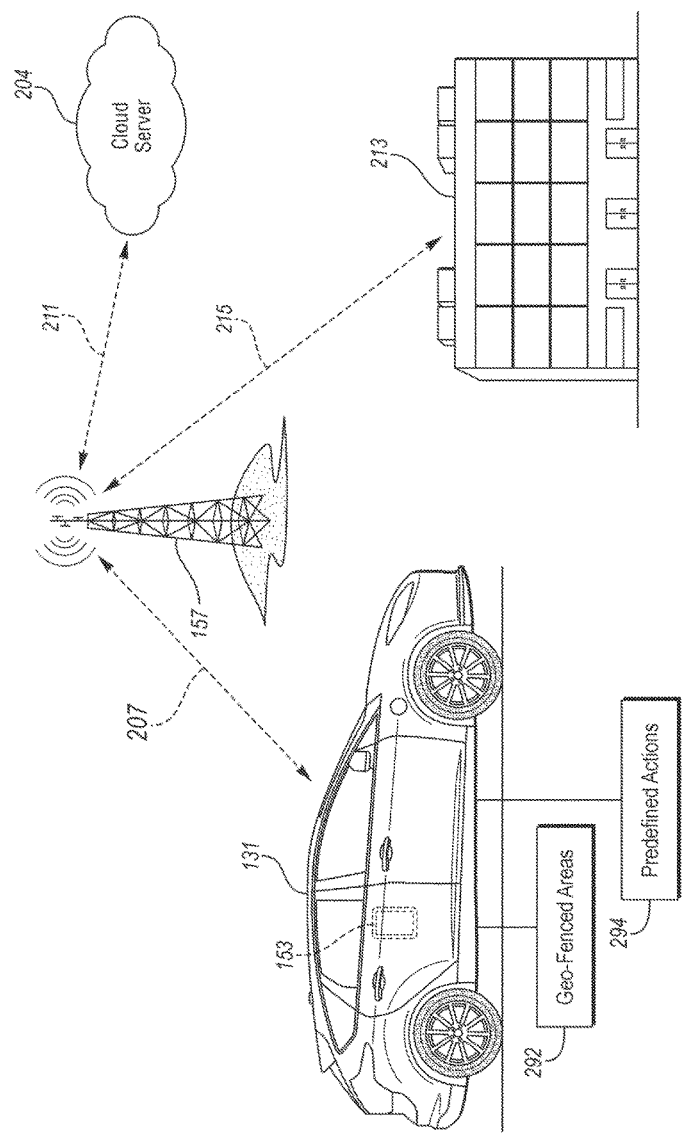
FIG. 2 illustrates an example block topology of a vehicle-based computing system that may be utilized in accordance with geo-fencing.

FIG. 2 illustrates an example block topology of a VCS 100 that may be utilized in accordance with geofencing alerts. The VCS 100 may communicate with other vehicle controllers 290 to identify geofenced areas 292, determine a current state of the vehicle 131, and invoke predefined actions 294 to assist in preparation for entering the identified geofenced areas 292.

The vehicle controllers 290 may include one or more vehicle components that may be used to receive vehicle 131 state information and/or commanded to perform various vehicle 131 operations. As some examples, the VCS 100 may communicate with the GPS device 124 to determine a current location of the vehicle 131, with a tire pressure monitor (TPM) to determine tire pressure, with a fuel sensor to detect fuel levels, with oil level, battery level and battery temperature sensors to detect oil and battery state, with seatbelt monitor and occupancy sensors to determine vehicle 131 occupancy. As some further examples, the VCS 100 may communicate with the controllers 290 to operate mechanical functions of the vehicle 131, such as communicating with a door locking module to lock or unlock vehicle 131 doors, with a window module to roll down or up vehicle 131 windows, with a moon-roof/sun-roof module to roll down or up a roof window, and with light modules to activate or deactivate vehicle 131 lights, or with a wiper controller to activate or deactivate windshield wipers. Other functions may include activating a headlight or fog lamps of a vehicle, turning on or off a window shade, or activating a tinted window function. The VCS may communicate with other modules to activate vehicle features, such as the anti-brake system (ABS), activating stability control, stiffening the suspension, or a fuel-economy feature for when the vehicle enters a high-speed geo-fenced zone.

The vehicle 131 may utilize a nomadic device 153 to communicate with the cellular tower 157. In another embodiment, the vehicle 131 may include its own embedded telematics modem 163 to communicate with the cellular tower 157. The nomadic device 153 or the embedded vehicle modem 163 may communicate with tower 157 by sending signals 207 from the vehicle 131. The vehicle 131 may send vehicle 131 data or commands to remote users or locations utilizing the cellular tower 157. Furthermore, the vehicle 131 may retrieve requests or other data packets that may be utilized in the vehicle 131.

The cellular tower 157 may allow the vehicle 131 to communicate with a cloud server 209. The cloud server 209 may be an off-board server that includes database or access to other databases to retrieve dynamic content. The cloud server 209 may be utilized to communicate off-board information that the vehicle 131 may not otherwise be capable of accessing. For instance, the cloud server 209 may allow the vehicle 131 to retrieve weather data, criminal statistics, or other information using signals 211 transmitted between the vehicle 131 and the cellular tower 157. The cloud server 209 may also allow the vehicle 131 to communicate with infrastructure 213 remote from the vehicle 131, such as a user's home or office. For instance, the vehicle 131 may utilize the tower 157 communication signal 215 to communicate with home or office infrastructure 213. The signals communicated from the vehicle 131 to the infrastructure 213 may be utilized to activate various systems in the infrastructure 213 or at another location remote from the vehicle 131, as described further below.

The geo-fenced areas 292 may include virtual perimeters defining boundaries surrounding geographic areas, as well as type information indicative of attributes of the bounded area. The VCS 100 may maintain information indicative of the geo-fenced areas 292, e.g., in the persistent storage 107 shown in FIG. 1, or at the off-board cloud server 209. As discussed herein, the geo-fenced area 292 may be of one of three predefined types, where each type may coexist or operate as a stand-alone feature. However, it should be noted that other embodiments may include more or fewer than three types of geo-fenced area 292.

Continuing with the example, a first type of geo-fenced area 292 may be defined as including high crime or include static data that does not change daily. The VCS 100 may utilize the navigation database with map data identifying such a high-crime area. Or, the VCS 100 may be in communication with the cloud server 209 to receive data defining high-crime areas, e.g., in conjunction with a navigation system. A second type of geo-fenced area 292 may be defined based on severe weather or other dynamic data that changes more frequently (e.g. hourly, daily, weekly, etc.). The VCS 100 may receive weather reports from national, local, and/or websites to determine weather conditions surrounding the vehicle 131. A third type of geo-fenced area 292 may be used-defined based on a customer or driver's definition for particular criteria.

The predefined actions 294 may include one or more functions to be triggered by the VCS 100 according to the vehicle 131 location in relation to the geo-fenced areas 292. The VCS 100 may maintain information indicative of the predefined actions 294, e.g., in the persistent storage 107 shown in FIG. 1. Predefined actions 294 may be triggered, for example, responsive to the vehicle 131 entering a geofenced area 292 and/or responsive to the vehicle 131 reaching a predefined distance or proximity of the geo-fenced area 292.

One or more of the predefined actions 294 may be defined according to a type of the geo-fenced area 292. For example, a first set of actions may be defined to be automatically triggered by the VCS 100 responsive to vehicle 131 entry or proximity to a first type of geo-fenced area 292, a second set of actions may be defined to be automatically triggered by the VCS 100 responsive to vehicle 131 entry or proximity to a second type of geo-fenced area 292, and a third set of actions may be defined to be automatically triggered by the VCS 100 responsive to vehicle 131 entry or proximity to a third type of geo-fenced area 292.

The predefined actions 294 may include, as some examples, providing an alert to the driver, providing an alert to a designated person outside the vehicle, rolling up windows, activating one or more safety features, turning on headlights, or requesting an action to be performed by home or office infrastructure 213. Further aspects of the predefined actions 294 are discussed in detail below.

Figure 3:
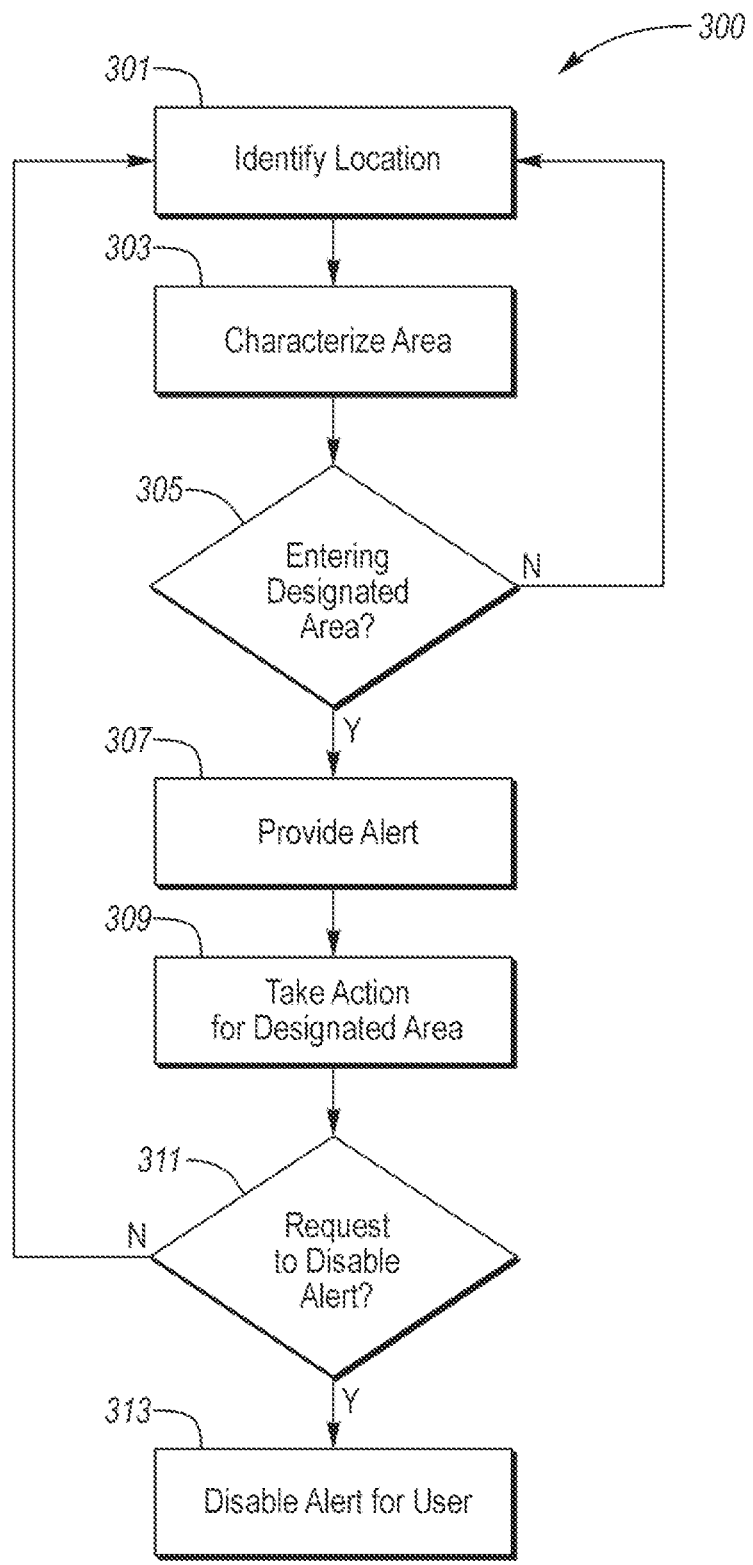
FIG. 3 illustrates an example flow chart of the vehicle utilizing a geo-fencing application.

FIG. 3 illustrates an example flow chart 300 of a process of the vehicle 131 for performed predefined actions 294 based on vehicle 131 location relative to geo-fenced areas 292. In an example, the process may be performed by a geo-fencing application installed to the VCS 100.

The vehicle 131 may identify the locations of the vehicle 131 and other devices at 301. The VCS 100 may utilize the GPS device 124 in communication with the VCS 100 to identify a current location of the vehicle 131. As another possibility, the VCS 100 may be in communication with a nomadic device 153 that includes a GPS receiver integrated with the nomadic device 153, where the VCS 100 may be configured to communicate with the nomadic device 153 to receive GPS data. Additionally or alternately, the nomadic device 153 may be utilized for cell-phone triangulation or RFID to obtain or refine the location of the vehicle 131.

At 303, the VCS 100 may characterize the location to determine if the vehicle 131 is in a geo-fenced area 292 and if so, what type. In an example, the VCS 100 may utilize the location determined at 301 and the stored geo-fenced area 292 data to identify a type of geo-fenced area 292, if any, in which the vehicle 131 is located.

The VCS 100 may determine if the vehicle 131 is entering a geo-fenced area 292 at 305. The geo-fenced area 292 may include a type one, two, or three geo-fenced area 292. The VCS 100 may compare the location data defined by GPS coordinates of the vehicle 131 or nomadic device 153 with the data defining the geo-fenced area. If the vehicle 131 has not entered a designated area, the vehicle 131 may continue to characterize the current location to identify if it is in a designated geo-fenced area 292 at 303. If the vehicle 131 has entered a designated geo-fenced area 292, the VCS 100 may trigger one or more predefined actions 294 associated with the geo-fenced area 292.

Upon entering a designated geo-fenced area 292, the VCS 100 may identify the predefined actions 294 associated with the geo-fenced area 292. Based on the identified predefined actions 294, the VCS 100 may trigger an alert to a driver, another vehicle 131, or another system via a vehicle 131 communication network or wireless communication at 307. The alert may be created in accordance with the predefined actions 294 associated with the type of the geo-fenced area 292 the vehicle 131 has entered into. In one example, the vehicle 131 may enter a type one geo-fenced area 292 with high crime. Upon entering a geo-fenced area 292 designated with high crime, based on the predefined actions 294 an alert may be sent to the driver, the driver's parents, spouse, or other acquaintance defined by contact information. The VCS 100 may include an address book that includes names and contact information defined by a user, or be in communication with a remote server or device (e.g. mobile phone) that includes contact information of a driver or user. The VCS 100 may allow a user to define which contacts may be notified upon the vehicle 131 entering each different type of geo-fenced area. The VCS 100 may send out an alert or notification to a driver's designees or contact from the address book either before entering a zone (e.g. by a pre-defined distance or pre-defined estimated time of arrival to entering the zone) or after entering a zone. The VCS 100 may also send out an alert or notification before exiting a zone (e.g. by a pre-defined distance or pre-defined estimated time of arrival before exiting the zone) or after exiting a zone 292. Furthermore, the VCS 100 may allow a user to define a first, second, or sequential contact to alert upon entering each type of geo-fenced area 292 in case a higher-priority contact is not available. The high-crime geo-fenced area 292 may be defined by a specific threshold as related to crime statistics. The alerts for a high-crime geo-fenced area 292 may include various information, including safety check lists, information for emergency numbers (e.g., roadside service numbers, police phone numbers, etc.) and other emergency information, such as where to find an emergency kit in the vehicle 131 or operation of how to use the emergency kit. The alert may be output to the display, the speaker 113, and/or the nomadic device 153. Additionally, the VCS 100 may output the alert to another vehicle 131 or device (e.g. nomadic device 153) utilizing the cloud server 209.

In another scenario, upon entering a geo-fenced area 292 designated with a specific type of weather (e.g., type two geo-fenced area 292), an alert may be tailored using the predefined actions 294 corresponding to the type two geo-fenced area 292 based upon the vehicle 131 entering that geo-fenced area 292. In one example, the vehicle 131 may enter a type two geo-fenced area 292 with severe weather or some specific weather. Upon entering a geo-fenced area 292 designated with a type of weather alert, an alert may be sent to the driver, the driver's parents, spouse, or other acquaintance defined by contact information. The weather may be defined by a weather broadcast or a severe weather report threshold. The alerts for weather may include various information, including driving tips related to that type of weather, information for emergency numbers (e.g., AAA numbers, police phone numbers, etc.), alternative routes to avoid the weather, or suggestions to delay the trip.

In another scenario, upon entering a geo-fenced area 292 designated with a user-defined criteria (e.g., type three geo-fenced area 292), a customized alert may be created using the predefined actions 294 corresponding to the type three geo-fenced area 292 based upon the vehicle 131 entering that user-defined geo-fenced area 292. Some instances of user-defined geo-fenced areas 292 may include a geo-fenced area 292 that are in pre-defined distance from a user's home, close to work, or close to a friend's house. The type three geo-fenced area 292 may be defined by a user at the vehicle 131, home computer, or mobile phone. Upon entering a type three geo-fenced area 292, an alert may be sent to the driver, the driver's parents, spouse, or other acquaintance defined by contact information. The alert may notify the contact person of that location and the characterization of that location (e.g., work). The alerts may include making a phone call upon entering the geo-fenced area 292 (e.g., calling home), sending a text message to a contact person (e.g., sending a text message to a spouse), or other contact. Furthermore, the alerts may output reminders or suggestions, such as a suggestion to use a local gas station upon the route going to a destination.

The VCS 100 may also take an action based upon the specific type of geo-fenced area 292 the vehicle 131 has entered at 309. For example, in the scenario when the type one geo-fenced area 292 (e.g., high crime) has been entered by a vehicle 131, the VCS 100 may send a message to the vehicle controller 290 to roll up the windows or to activate certain safety features (e.g., 911-assist). The commands for vehicle 131 operation may be defined at the VCS 100 or may be received by a remote server for processing at the VCS 100. In another scenario, a vehicle 131 entering a type two geo-fenced area 292 (e.g., severe weather) may send a request or command to the vehicle controller 290 to turn on the fog lamps and specific weather protective features (e.g., traction control for snow, windshield wipers turned on, stability control, etc.). In yet another scenario, a vehicle 131 entering a type three geo-fenced area 292 (e.g., user-defined) may have a tailored command defined by the user or by the vehicle 131. One example includes the VCS 100 sending a command to turn off or on a home or office's heating or air conditioner, lights, alarms, etc. A vehicle 131 setting may allow a user to associate each geo-fence area 292 with the various vehicle 131 functions or other actions.

The vehicle 131 may also provide recommendations based upon the environment of the vehicle 131 as associated with the geo-fenced area 292. For example, the VCS 100 may consider if a driver cannot reach a destination without stopping for fuel, and there may be a hazardous condition associated with a geo-fenced area 292 along the route. The VCS 100 may recommend refueling prior to entering the geo-fenced area 292. Thus, the VCS 100 may recommend refueling prior to entering the geo-fenced area 292 by calculating the estimated vehicle 131 fuel range, the estimated distance to various boundaries of the geo-fenced area 292, and the estimated distance to various destinations. If the VCS 100 calculates that refueling will likely be required due to a low fuel state within the geo-fenced area 292, the VCS 100 may recommend that the user refuel before entering the geo-fenced area 292. Other recommendations may be utilized based on vehicle 131 sensors and predictability of the environment of the vehicle 131 as associated with the geo-fenced area 292. For example, recommendations based upon the vehicle 131 entering a specific geo-fenced area 292 may include determining the tire pressure of the vehicle 131 and recommend adding air to the tires, recommendations related to the windshield wipers being activated or the windshield wiper settings, determining a mobile phone's battery level and recommending charging the phone, etc.

The vehicle 131 may also provide various recommendations based on the criteria of the geo-fenced area 292. For example, the VCS 100 may always route around high weather conditions, such as severe weather, or high-crime conditions. In another instance, the VCS 100 may sometimes route around certain other conditions, such as mild weather or slightly higher than normal crime conditions. Thus, in one example, the VCS 100 may always avoid high-crime geo-fenced areas 292 at all times, but only avoid certain other geo-fenced areas 292 if a current fuel state makes it possible to stop in one of those geo-fenced areas 292. A pre-defined driver profile may be used to define such geo-fenced areas 292. The driver profile may be stored, as some examples, to the VCS 100 or to the user's nomadic device 153.

The VCS 100 may also consider the destination of the user for determining the geo-fence. The VCS 100 may select a destination and import parameters (e.g., fence, weather, etc.) associated with a vehicle 131 or driver and develop geo-fenced areas 292 between the location and destination. Using the geo-fenced areas 292, the VCS 100 may determine a route, if possible, that avoids all geo-fenced areas 292 or minimizes contacts with the geo-fenced areas 292. There may be alternative waypoints that may be routed around multiple geo-fenced areas 292 at the beginning of guidance. The VCS 100 may provide a route specifying travel through a geo-fenced area 292, but with minimum contacts as possible to avoid those geo-fenced areas 292. Thus, rather than completely avoiding the geo-fenced areas 292, the VCS 100 may simply minimize those contacts. The VCS 100 may maintain a map database (e.g., in storage 107, to a remote server such as cloud server 209) to calculate various routes to proceed to a destination. The VCS 100 may compare the driving time within a boundary of the geo-fenced areas 292. The VCS 100 may compare the various routes to determine a minimum driving time.

Upon taking the actions based on the geo-fenced area 292, the VCS 100 may also allow the primary driver/customers to turn off the alert at 311. If the option to set the alert off is activated, the VCS 100 may ignore the alert if the appropriate driver or user has access to do so. Prior to sending an alert or taking action, the VCS 100 may also notify a user that he or she has an option to cancel the action or alert. Only specific users may be allowed to turn off the alert at 313. For example, the VCS 100 may recognize the driver based on wireless signals indicating presence of the nomadic device 153 or key fob. If the user cannot be authenticated as being the driver based on the nomadic device 153 or key fob, the user cannot cancel the notifications. Thus, a teenage driver utilizing a parent's car (or another car) may not have access to turn off the alerts. The VCS 100 may determine that the driver has the approval to turn off or on the alerts for each geo-fenced area type. Furthermore, the geo-fenced area may be defined by the driver. For example, a novice driver may be requested to avoid a high-crime area, but an experienced driver may not receive such requests.

Figure 4:
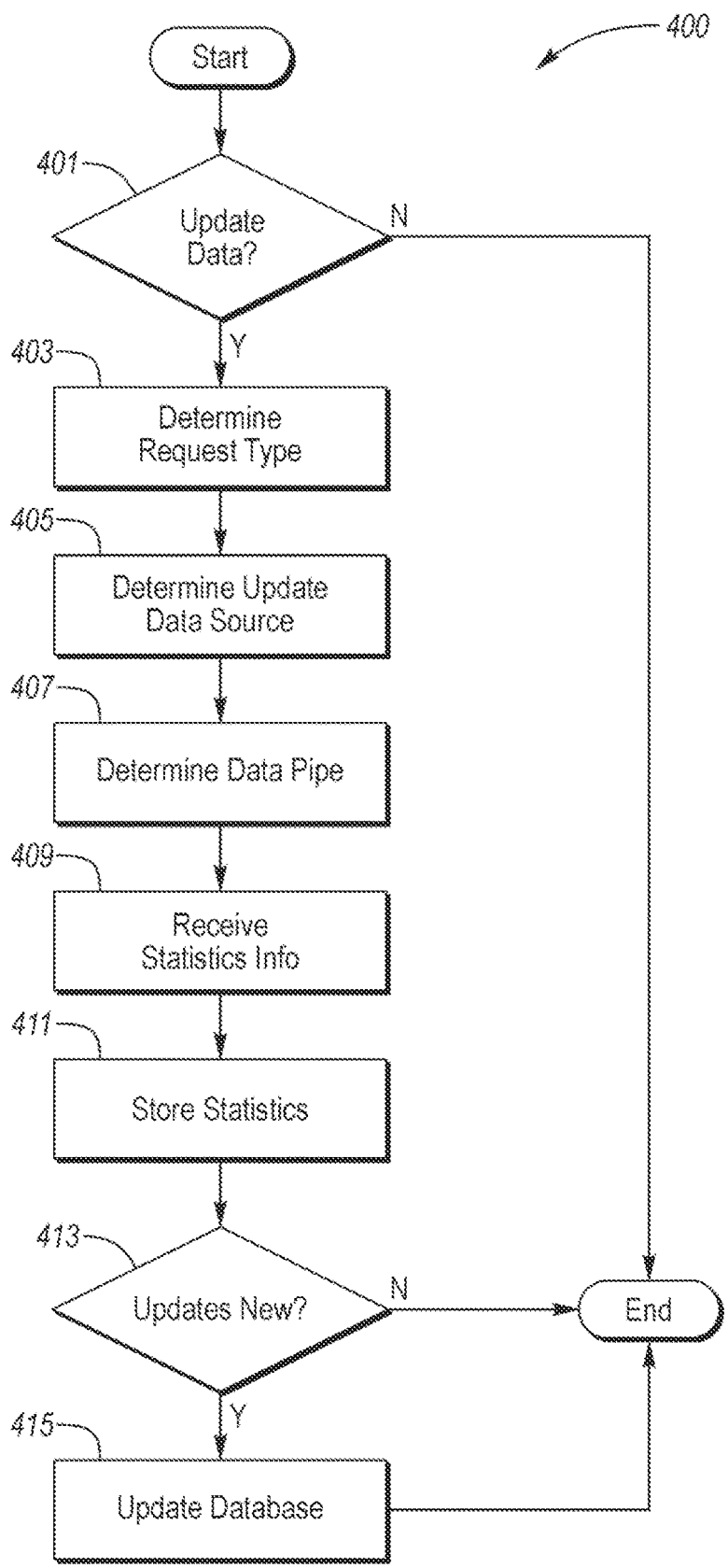
FIG. 4 is an illustrative flow chart exemplifying geo-fencing updates at the vehicle computer system.

FIG. 4 is an illustrative flow chart 400 of a process for updating geo-fenced area 292 data by the VCS 100. The VCS 100 may be in communication with a remote server, such as the cloud server 209, for updating data flowing to the VCS 100. Data packets may be sent to the VCS 100 and upon being received at the vehicle 131, the packets may be de-packetized to obtain relevant data and information. The VCS 100 may first determine if an update cycle is appropriate at 401. The VCS 100 may utilize push notifications from a remote server or a user's nomadic device 153 to determine if the update is appropriate.

Upon establishing that an update cycle is appropriate, the VCS 100 may receive a request from a user for either a manual or automatic update at 403. A request for either a manual or automatic update may be presented to the user by a vehicle display 104, vehicle speaker 113, or other type of user interface. The nomadic device 153 may also allow such a request. Thus, the user may require map data to be updated, weather information, crime information, or other information related to the geo-fence to be updated. The VCS 100 may receive data indicating which updates are available at 405. Such information may include using updated government crime-rate database or updated weather report data. The data may be retrieved by the VCS 100 utilizing either the nomadic device 153 or by directly communicating with the cloud server 209 remotely from the nomadic device 153.

The VCS 100 may determine the appropriate data pipe input for the data at 407. The VCS 100 may receive information related to the update size to define the appropriate circumstances for updating the data. In one example, the data may be large in size (e.g., greater than a predefined threshold number of bytes), thus the VCS 100 may wait to receive an update by utilizing a wireless connection. In another embodiment, the user may utilize nomadic devices 153 in the vehicle 131 to retrieve the data. The data may also be received via a connection of the modem 163 to a telecommunications network. The data may be accompanied in various formats, and may be obtained in data packets that may be later de-packetized.

The VCS 100 may receive updated statistics information at 409 related to the crime rate or weather data. The information may be sent from a remote server upon determining the appropriate pipe to transmit the data through. The information may be limited to a specific region or relate to the whole map database. In one instance, the updated information may apply to the entire map database, while another update may apply to a specific region, state, city, etc. The VCS 100 may also store the updated information either on-board at the vehicle 131 or off-board at a remote server at 411. The VCS 100 may determine to store the information at either site based on various factors, including where the vehicle 131 is located or storage capacity of the VCS 100.

Upon receiving notification of an update, the VCS 100 may then determine if the updates are similar to the previous update at 413. If the updates are the same or contain overlapping updates that do not require an updated based on the vehicles setting, the VCS 100 will ignore the updates. If the updates are not the same, the VCS 100 may update the data onto the mapping system of the VCS 100 or off-board server at 415. Such updates may take place during guidance or after route guidance has been completed.

Figure 5:
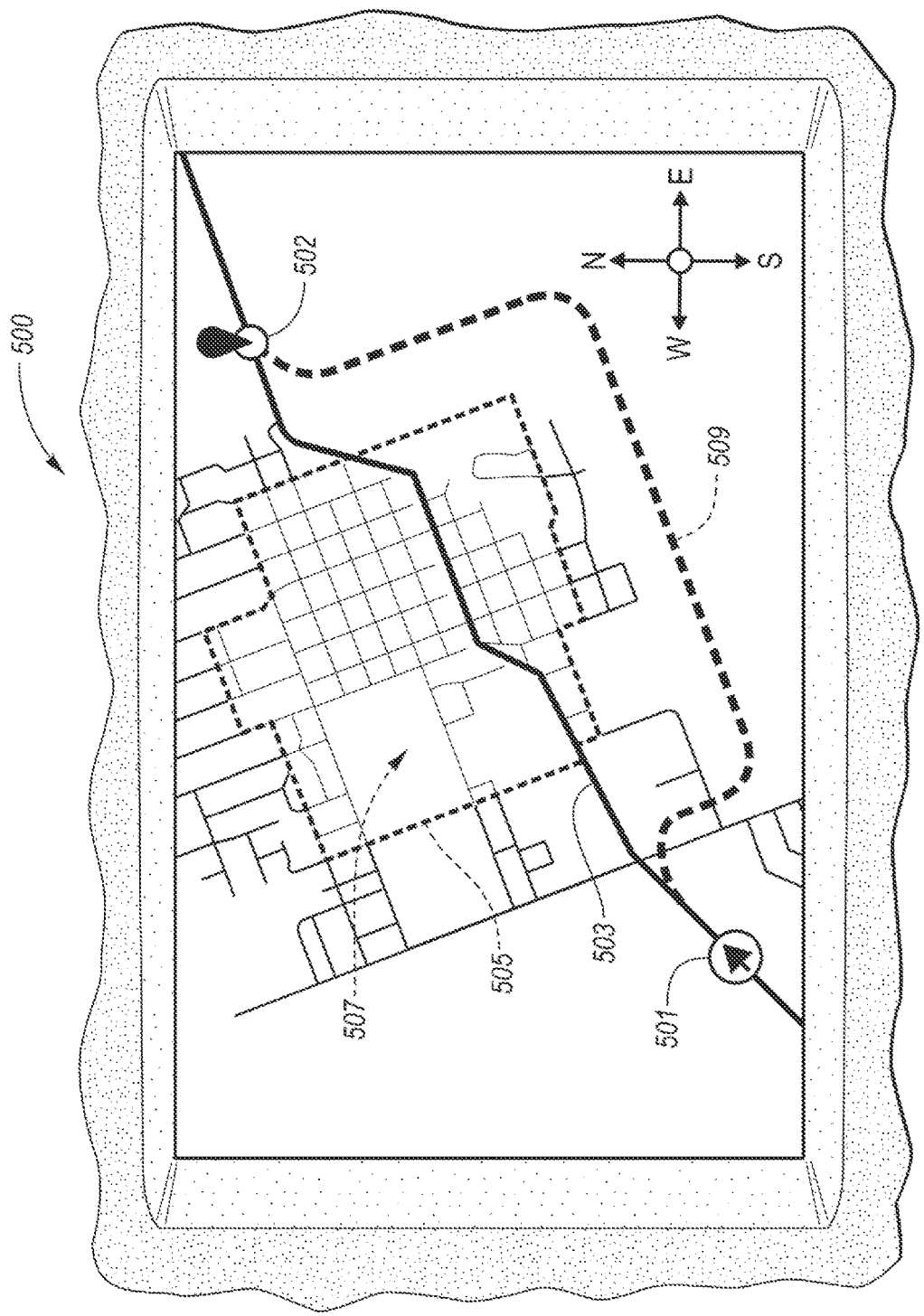
FIG. 5 is an illustrative embodiment of a geo-fencing application output on a vehicle display.

FIG. 5 is an illustrative embodiment of a geo-fencing application output on the vehicle display 104. The vehicle display 104 may work in coordination with a navigation application of the VCS 100, or a remote server, to include a geo-fencing application. The display 104 may output a current vehicle position (CVP) 501 of the vehicle 131 on a map. The CVP 501 may be determined utilizing GPS coordinates and other vehicle 131 sensors (e.g. accelerometer, gyroscope, etc.) to show where a vehicle 131 is located. As the vehicle 131 travels, the CVP 501 will change and be updated on the display 104.

The vehicle 131 may utilize a navigation application, or another application on the vehicle 131, nomadic device 153, or server, to navigate to a destination 502. The navigation application may determine a route 503 to direct a user to the destination 502. The route 503 may break a geo-fenced boundary 505 while navigating to the destination 502. As explained above, the geo-fenced boundary 505 may be calculated based on a specific driver or a location of the vehicle 131 within a hazardous area, among other things. In certain embodiments, the geo-fenced boundary 505 will establish a geo-fenced area 507 around a hazardous area that may include high-crime rates, severe weather conditions, or user-defined boundaries. The navigation application may determine an alternative route for the driver to be able to enter the destination 502 without breaking the geo-fenced boundary 505 and avoiding a geo-fenced area 507. While alternative routes may exist that completely avoid the geo-fenced area 507, such as an alternative route 509, the navigation application may output an alternative route that simply minimizes the travel time within geo-fenced area 507.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system, comprising:
   a wireless transceiver configured to communicate with a mobile device; and
   a processor programmed to:
      output to a driver a vehicle low-fuel alert indicating a fuel station location in an area remote from a high-crime area in response to a vehicle reaching a pre-defined distance from a boundary of the high-crime area; and
      activate a predefined vehicle safety function addressing the high-crime area based upon the vehicle entering the boundary.

2. The system of claim 1, wherein the processor is further configured to determine a route to a destination that minimizes driving time within the high-crime area.

3. The system of claim 1, wherein the high-crime area is defined by a map database associated with a vehicle computer system.

4. The system of claim 1, wherein the predefined vehicle safety function includes at least one of closing a window, closing a moon-roof, activating a fog lamp, activating a window shade, or locking a door.

5. The system of claim 1, wherein the processor is further configured to identify the vehicle safety function based upon a user definition of predefined actions specifying the vehicle safety function addressing the high-crime area.

6. The system of claim 1, wherein the processor is further configured to send a request to a remote server to activate a predefined remote safety function at a location associated with the driver and remote from the vehicle, in response to reaching the boundary of the high-crime area.

7. The system of claim 1, wherein the boundary of the high-crime area is configured to be defined according to data received from a remote server or adjusted by a user.

8. The system of claim 1, wherein the processor is further configured to receive update information from a remote server of a map database of a vehicle computer system defining the boundary.

9. A method, comprising:
   determining a driver of a vehicle utilizing one or more vehicle controllers;

receiving one or more geo-fences associated with the driver and a high-crime area along a route defined by route data;

outputting an alert to the driver indicating a location of the high-crime area when the vehicle is within a predefined distance of the geo-fence;

outputting an alert identifying a location of a fuel station in an area remote from the high-crime area based upon determining a low fuel level of the vehicle will be reached upon entering the high-crime area; and activating a predefined vehicle function addressing the high-crime area in response to a request from a remote server that is based upon the vehicle entering a boundary of the geo-fence.

10. The method of claim 9, wherein the one or more vehicle controllers is configured to communicate with a key fob to determine an identity of the driver.

11. The method of claim 9, wherein the one or more vehicle controllers includes a wireless transceiver configured to communicate with a mobile device, and further comprising outputting the alert to the driver using the mobile device.

12. The method of claim 9, wherein the vehicle function includes at least one of automatically closing a window, closing a moon-roof, or locking a door.

13. The method of claim 9, wherein the geo-fence is user-defined.

14. The method of claim 9, wherein the vehicle function is activation of a vehicle controller associated with a type of geo-fence that the vehicle entered.

15. A system, comprising:

a processor configured to, in response to identifying a driver of a vehicle and a vehicle route, establish a geo-fence corresponding to the driver and a high-crime rate area along the route, and outputting an alert identifying a location of a fuel station in an area remote from the high-crime area based upon determining a low fuel level of the vehicle will be reached upon entering the high-crime area.

16. The system of claim 15, wherein the processor is further configured to execute commands to request a vehicle controller to activate a mechanical vehicle function addressing the area based upon entering a boundary of the geo-fence, and output a vehicle-function alert to the driver indicating activation of the function.

17. The system of claim 16, wherein the vehicle-function alert includes an option to cancel activation of the mechanical vehicle function.

18. The system of claim 15, wherein the processor is further configured to execute commands to request a remote server to activate a remote function at a location associated with the driver and remote from the vehicle, in response to entering a boundary of the geo-fence.

19. The system of claim 16, wherein the mechanical vehicle function includes one of at least closing a window, closing a moon-roof, and locking a door.

* * * * *